United States Patent [19]

Christianson et al.

[11] Patent Number: 4,913,597

[45] Date of Patent: Apr. 3, 1990

[54] SILENCER FOR PNEUMATIC GRAIN CONVEYOR

[75] Inventors: Roy O. Christianson; Frank W. Christianson, both of Blomkest, Minn.

[73] Assignee: Christianson Systems, Inc., Blomkest, Minn.

[21] Appl. No.: 85,395

[22] Filed: Aug. 12, 1987

[51] Int. Cl.⁴ ............................................. B65G 67/20
[52] U.S. Cl. ..................................... 406/39; 181/265; 406/109; 406/157; 406/171; 406/173
[58] Field of Search ............... 181/229, 237, 264, 265; 406/41–44, 157, 171, 173, 109

[56] References Cited

U.S. PATENT DOCUMENTS

| | | |
|---|---|---|
| D. 271,105 | 11/1983 | Christianson et al. ............. D15/10 |
| 582,485 | 5/1897 | Reeves et al. . |
| 692,094 | 1/1902 | Weeber . |
| 750,011 | 1/1904 | Willis et al. . |
| 792,804 | 6/1905 | Williams . |
| 890,686 | 4/1911 | Troike . |
| 990,686 | 4/1911 | Troike ............................. 181/265 |
| 1,115,873 | 11/1914 | Spencer ........................... 181/265 |
| 1,149,699 | 8/1915 | Sperry . |
| 1,468,398 | 9/1923 | Reed . |
| 1,490,957 | 4/1924 | Birger . |
| 1,598,578 | 8/1926 | Maxim . |
| 1,804,875 | 5/1931 | Hynes . |
| 2,142,268 | 1/1939 | Gibbs, Jr. . |
| 2,643,730 | 6/1953 | Beattie . |
| 2,806,548 | 9/1957 | Carroll . |
| 2,995,200 | 8/1961 | Seifert . |
| 3,194,341 | 7/1965 | Haag . |
| 3,612,216 | 10/1971 | Rieder . |
| 3,616,721 | 11/1970 | Laukhuff . |
| 4,016,994 | 4/1977 | Wurster .............................. 406/39 |
| 4,100,720 | 7/1978 | Carnewal et al. ................. 56/14.6 |
| 4,394,259 | 7/1983 | Benny et al. ...................... 406/151 |
| 4,433,946 | 2/1984 | Christianson et al. ............. 406/43 |
| 4,450,932 | 5/1983 | Khosropour . |
| 4,572,726 | 2/1986 | Van Abbema ..................... 406/109 |
| 4,580,928 | 4/1986 | Van Abbema ..................... 406/43 |
| 4,718,924 | 1/1988 | DeMarco ............................ 55/302 |

FOREIGN PATENT DOCUMENTS 743 of 1880 United Kingdom ................ 181/265

OTHER PUBLICATIONS

"Meet the Little Giant ®", CSI, 1985.
"Specification Print Exhaust Silencer", Pennsylvania Separator Co., 1986.
"Intake Filter and Filter Silencers; Reactive Silencers; and Reactive—Absorptive Silencers", Jul. 8, 1986.
"Specifications RD Group", Universal Silencer, 1986.
"Rotary Blower Intake Silencers", 1986.

Primary Examiner—Sherman D. Basinger
Assistant Examiner—Stephen P. Avila
Attorney, Agent, or Firm—Merchant, Gould, Smith, Edell, Welter & Schmidt

[57] ABSTRACT

A silencer (70) which is particularly adapted for use with a pneumatic grain conveyor (10) includes a housing (72) with an arrangement of internal baffles (78, 80 and 82) defining a serpentine flow path of increasing cross-sectional area between an inlet (74) and an outlet (76) which is self-cleaning and effects noise reduction without absorptive material that would otherwise quickly clog the silencer.

4 Claims, 2 Drawing Sheets

SILENCER FOR PNEUMATIC GRAIN CONVEYOR

TECHNICAL FIELD

The present invention relates generally to pneumatic grain conveyors, and more particularly to a silencer which is adapted for connection between the air pump or blower and the rotary valve at the base of a cyclone separator in a pneumatic material handling device for noise reduction without undue susceptibility to clogging.

BACKGROUND ART

Pneumatic conveyors are widely used today for transferring grain and other types of granular material. For example, such devices can be used for transferring grain from a storage silo to a delivery truck, a laborious and time-consuming task which was otherwise accomplished by shoveling. Such pneumatic conveyors generally include a cyclone separator having a tangential material inlet and a bottom axial material outlet. The suction side of a blower is connected to an axial air inlet in the top of the separator. The high pressure side of the blower in connected to a rotary valve which is connected between the material outlet of the separator and a line leading to the point of discharge. Such devices have been mounted for mobility and adapted for use with power take-off attachments on tractors to facilitate portability and use in unloading various silos on a farm, for example.

Pneumatic grain conveyors of this general type have been available for years under the name HANDLAIR from Christianson Systems, Inc. of Blomkest, Minnesota, the assignee hereof. See U.S. Pat. Nos. 4,433,946 and Des. 271,105.

Heretofore, however, such pneumatic conveyors have tended to be relatively noisy. The noise is primarily due to the flow of high pressure air from the discharge side of the positive displacement air pump or blower, the intake side of which is connected to the cyclone separator, and thus tends to receive air dirty and laden with dust and other foreign particles which are too large for centrifugal separation with the grain or other granular material being handled. Discharge silencers for rotary blowers have been available heretofore, however, the silencers of the prior art have used chambering and/or absorptive materials which tend to become clogged, particularly when used with dirty air. As a result, the silencers of the prior art quickly become ineffective, and are thus not suitable for use with pneumatic grain conveyors. Heretofore, there has not been available a silencer for pneumatic grain conveyors which is self-cleaning and effects noise reduction without the need for absorptive material that would otherwise become clogged and required cleaning and/or replacement and thus interruption in operation, down time, and expense.

A need has thus arisen for a self-cleaning silencer which is particularly adapted for use with a pneumatic grain conveyor.

SUMMARY OF THE INVENTION

The present invention comprises a silencer for a pneumatic grain conveyor that overcomes the foregoing and other difficulties associated with the prior art. In accordance with the invention, there is provided a self-cleaning silencer which is adapted for connection between the discharge or high side of a blower and the air inlet of a rotary valve for reducing noise associated with the flow of pressurized air there between. The silencer herein is of simple, rugged construction and does not require absorptive materials which would otherwise become clogged, particularly when used with dirty air such as that received by the blower from the cyclone separator in a pneumatic conveyor. The silencer herein includes a case having an inlet and an outlet mounted in spaced-apart relationship. An arrangement of concentric tubes, alternate ones of which are fastened to opposite ends of the case, define a serpentine path of increasing cross-sectional flow area between the inlet and outlet which avoids chambering effects and the need for absorptive materials in order to achieve noise reduction without clogging.

BRIEF DESCRIPTION OF THE DRAWINGS

A better understanding of the invention can be had by reference to the following Detailed Description in conjunction with the accompanying Drawings, wherein.

DETAILED DESCRIPTION

Figure 1:
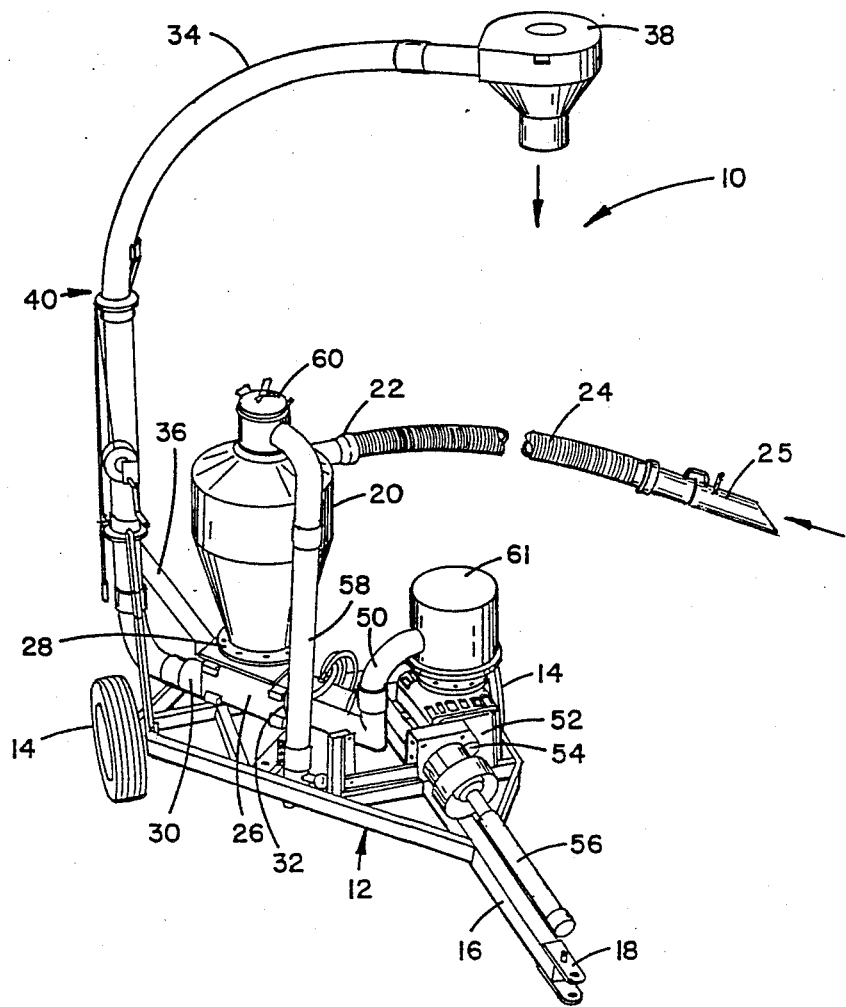
FIG. 1 is a perspective view of a pneumatic grain conveyor incorporating the silencer of the invention.

Referring now to the Drawings, and particularly referring to FIG. 1, there is shown a pneumatic grain conveyor 10 incorporating a silencer of the present invention. The pneumatic grain conveyor 10 includes a frame 12 having a pair of spacedapart wheels 14 thereon for mobility. A tongue 16 is provided on the front of frame 12, and a hitch 18 is provided on the front of the tongue for selective connection to a tractor or other suitable tow vehicle. The tongue 16 is preferably longitudinally offset from the center line of frame 12 for improved clearance when loading trucks or trailers.

A cyclone separator 20 is mounted on frame 12. The separator 20 includes a housing having a generally cylindrical upper side wall and a generally conical truncated lower wall as shown. A tangential grain or material inlet 22 is provided in the generally cylindrical upper wall of the housing of separator 20. A pipe or hose 24, which can be either rigid, semi rigid, or flexible is connected to the material inlet 22 and extends to a nozzle 25 for picking up the material to be conveyed. For example, the hose 24 would typically extend into a bin or silo for removing grain or the like therefrom.

A rotary air lock conveying valve 26 of the flow-through type is secured to the material outlet 28 in the conical truncated lower portion of the housing of separator 20. The valve 26 includes a material inlet coupled directly to the material outlet 28 of separator 20, a material outlet 30, and an air inlet 32. The valve 26 is typically hydraulically driven. A suitable valve is commercially available from Semco. The material outlet 30 is connected to a discharge pipe 34 which extends upwardly and is supported by an upright 36 on the rear corner of frame 12. A discharge cyclone 38 is provided on the end of pipe 34 for breaking the air lock and assuring that the grain or other material falls gently into an underlying trailer or truck (not shown).

The discharge pipe 34 is preferably of split construction to reduce clearance during transport of the pneumatic grain conveyor 10 between sites. In particular, the discharge pipe 34 includes a pivotal upper portion and a fixed lower portion interconnected by a coupling 40 like that shown in U.S. Pat. No. 4,433,946, the disclosure of which is hereby incorporated by reference. The upper portion of discharge pipe 34 folds between raised and lowered positions responsive to a crank or hydraulic cylinder arrangement.

The air inlet 32 of rotary valve 26 is connected by pipe 50 to the outlet of a blower 52, which is driven through a gear box 54 by a shaft 56 connected to the power takeoff (PTO) attachment of a tractor (not shown). For example, the RCS 409 or RCS 412 blower from Roots division of Dresser Industries, Inc. can be used for the blower 52, which typically operates at about 700-1600 CFM and 5-8 psi. The inlet of blower 52 is connected by pipe 58 to a filter assembly 60 mounted axially in the top end of separator 20.

The blower 52 is a positive displacement air pump which draws air from the separator 20 in order to lower the pressure therein, and thus effect suction on the material inlet 24 such that the grain or other material to be conveyed is drawn inwardly thus creating a vortex within the separator. The resulting centrifugal force causes the grain to move outwardly within the separator 20 as it swirls downwardly by gravity through the material outlet 28 and into valve 26, from which it is forced by the pressurized air from blower 52 through the discharge pipe 34. The swirling action within separator 20 results in separation of chaff, dust and other foreign material from the grain which is entrained in the air and carried through the filter assembly 60 and pipe 58 to blower 52 for pressurization. Although filter assembly 60 is used, it will be appreciated that air containing a fair amount of dust and foreign material enters the blower 52.

Figure 2:
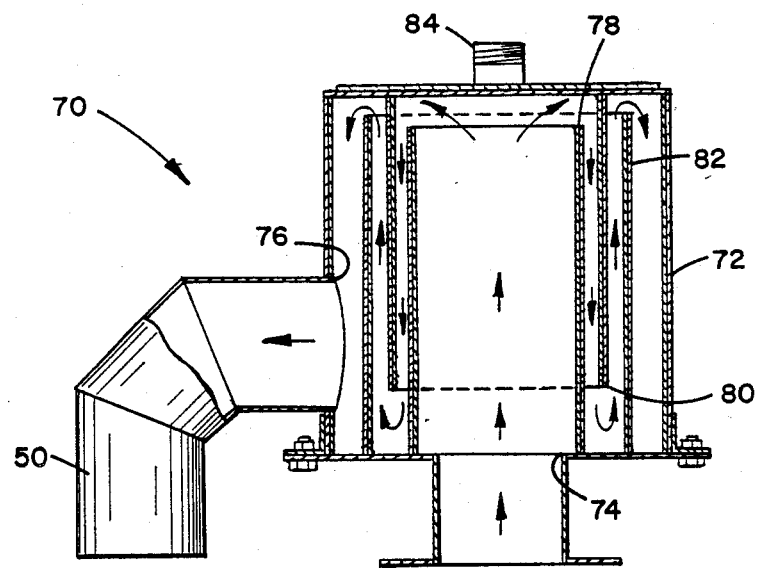
FIG. 2 is an enlarged cross-sectional view of a silencer incorporating the first embodiment.

Referring now to FIG. 2 in conjunction with FIG. 1, there is shown the silencer 70 which is particularly adapted for connection between the valve 26 and blower 52 for noise reduction without clogging. The silencer 70 includes a housing 72 having a spaced-apart inlet 74 and outlet 76. As illustrated, the inlet 74 is axially positioned in the lower end of housing 72, while the outlet 76 is radially positioned in the side of the housing. A series of baffles 78, 80 and 82 are alternately connected to opposite ends of the housing 72. In particular, the inner baffle 78 is secured at one end to the lower end of the housing 72 about the inlet 74, with its opposite end terminating in axially spaced-apart relationship with the top end of the housing. The intermediate baffle 80 is secured to the top end of housing 72 in spaced-apart, surrounding relationship with the free end of the inner baffle 78, with its opposite end terminating in axially spaced-apart relationship with the bottom end of the housing as shown. The outer baffle 82 is secured similarly to the inner baffle 78, but in surrounding relationship with the intermediate baffle 80. Although three baffles have been shown, any suitable number can be used. Baffles 78, 80 and 82 are thus concentric and are preferably of generally cylindrical shape, although baffles of rectangular or other suitable cross-sectional shape could also be used. The spacing between the baffles and housing depends upon the degree of noise reduction desired versus the amount of pressure lost which is acceptable. It will be noted that no absorptive material is utilized. This comprises a significant feature of the present invention. Further, it will be appreciated that the baffles 78, 80 and 82 define a serpentine flow path of increasing cross-sectional flow area between the inlet 74 and outlet 76 of silencer 70. This results in a silencer 70 which avoids chambering and absorptive materials which would otherwise result in clogging, while achieving substantial noise reduction in a manner which is uniquely suitable for use with pneumatic grain conveyors.

Although silencer 70 is illustrated as connected to the outlet or high pressure side of blower 52, it will be appreciated that it could be connected to the inlet or suction side of the blower. Further, the silencer 70 could be utilized with equipment other than pneumatic conveyors, wherein noise reduction under conditions of dirty air flow with little or no clogging are desired.

A fitting 84 for a pressure relief valve (not shown) is provided on the top end of silencer 70.

A silencer constructed in accordance with the invention has been found to provide about 25-30 dba noise reduction at about 1,000 cfm and 1-5 psi.

From the foregoing, it will thus be apparent that the present invention comprises a pneumatic grain conveyor having an improved silencer which is self-cleaning and reduces noise while functioning with dirty air without clogging. Other advantages will be evident to those skilled in the art.

Although particular embodiments of the invention have been illustrated in the accompanying Drawings and described in the foregoing Detailed Description, it will be understood that the invention is not limited only to the embodiments disclosed, but is intended to embrace any alternatives, equivalents, modifications and/or rearrangements of elements falling within the scope of the invention as defined by the following Claims.

What is claimed is:

1. A pneumatic grain conveyor comprising:
   a frame;
   a cyclone separator mounted on said frame, said separator including a closed housing with a top end wall having an air outlet therein, a generally cylindrical upper side wall having a tangential material inlet therein, and a generally conical truncated lower side wall having a material outlet at the bottom end thereof;
   a rotary valve including a material inlet connected to the material outlet of said cyclone separator, a material outlet, and an air inlet;
   a blower including an air inlet connected to the air outlet of said cyclone separator, and an air outlet;
   a silencer including an air inlet connected to the air outlet of said blower, and an air outlet connected to the air inlet of said rotary valve; and
   means for driving said blower means.

2. A pneumatic grain conveyor in accordance with claim 1 wherein said conveyor is transportable further comprising:
   a pair of wheel mounted in laterally spaced apart relationship on said frame for transportability;
   a hitch for selectively connecting said frame to a tow vehicle, 3. A pneumatic grain conveyor comprising:
   a frame;
   a cyclone separator mounted on said frame, said separator including a closed housing with a top end wall having an air outlet therein, a generally cylindrical upper side wall having a tangential material inlet therein, and a generally conical truncated lower side wall having a material outlet at the bottom end thereof;

a rotary valve including a material inlet connected to the material outlet of said cyclone separator, a material outlet, and an air inlet;

a blower including an air inlet connected to the air outlet of said cyclone separator, and an air outlet;

a silencer having a generally cylindrical housing with opposite closed ends interconnected by a surrounding side wall, an air inlet located in one of said ends and connected to the air outlet of said cyclone separator, and an air outlet located in the side wall thereof and connected to the air inlet of said rotary valve, a baffle arrangement disposed within said housing and including a plurality of concentric generally cylindrical baffle members, alternate ones of which are secured to opposite ends of said housing and which terminate short of the other end thereof, said baffle arrangement defining an open serpentine flow path of increasing cross-sectional area between the inlet and outlet of said silencer thereby muffling noise and providing for self-cleaning;

means for driving said blower means.

4. A pneumatic grain conveyor in accordance with claim 3 further comprising a filter mounted in the air outlet of said cyclone separator.

* * * * *